United States Patent [19]

Kanai et al.

[11] Patent Number: 4,494,722
[45] Date of Patent: Jan. 22, 1985

[54] EXHAUST UNIT SUPPORT DEVICE

[75] Inventors: Shunichiro Kanai, Sagamihara; Teruo Miyauchi, Hadano, both of Japan

[73] Assignee: Nissan Motor Company, Limited, Yokohama, Japan

[21] Appl. No.: 401,910

[22] Filed: Jul. 26, 1982

[30] Foreign Application Priority Data

Oct. 9, 1981 [JP]  Japan ............................... 56-161758

[51] Int. Cl.³ .............................................. F16M 13/00
[52] U.S. Cl. .................................... 248/621; 248/566; 248/609
[58] Field of Search ............... 248/621, 619, 618, 566, 248/615, 620, 608, 609, 604, 603, 559

[56] References Cited

U.S. PATENT DOCUMENTS

| | | | |
|---|---|---|---|
| 2,812,009 | 11/1957 | Skirvin | 248/618 |
| 2,883,130 | 4/1959 | Rose | 248/621 |
| 3,329,230 | 7/1967 | Castelet | 248/608 |
| 4,203,546 | 5/1980 | Raquet et al. | 248/559 |

Primary Examiner—William H. Schultz
Assistant Examiner—Ramon O. Ramirez
Attorney, Agent, or Firm—Lane, Aitken & Kananen

[57] ABSTRACT

In an exhaust system of an internal combustion engine installed on an automotive vehicle having a body structure wherein the exhaust system includes exhaust-system component units such as an exhaust pipe and an exhaust-cleaning catalytic converter, an exhaust unit support device for having the exhaust-system component units mounted on the vehicle body structure, comprising a first coupling member securely mounted on at least one of the exhaust-system component units, a second coupling member securely attached to the body structure, an elastic support member having a portion securely attached to the first coupling member and a portion securely attached to the second coupling member, and a vibration-damping block having a portion connected to the second coupling member and a portion connected to the vehicle body structure.

16 Claims, 7 Drawing Figures

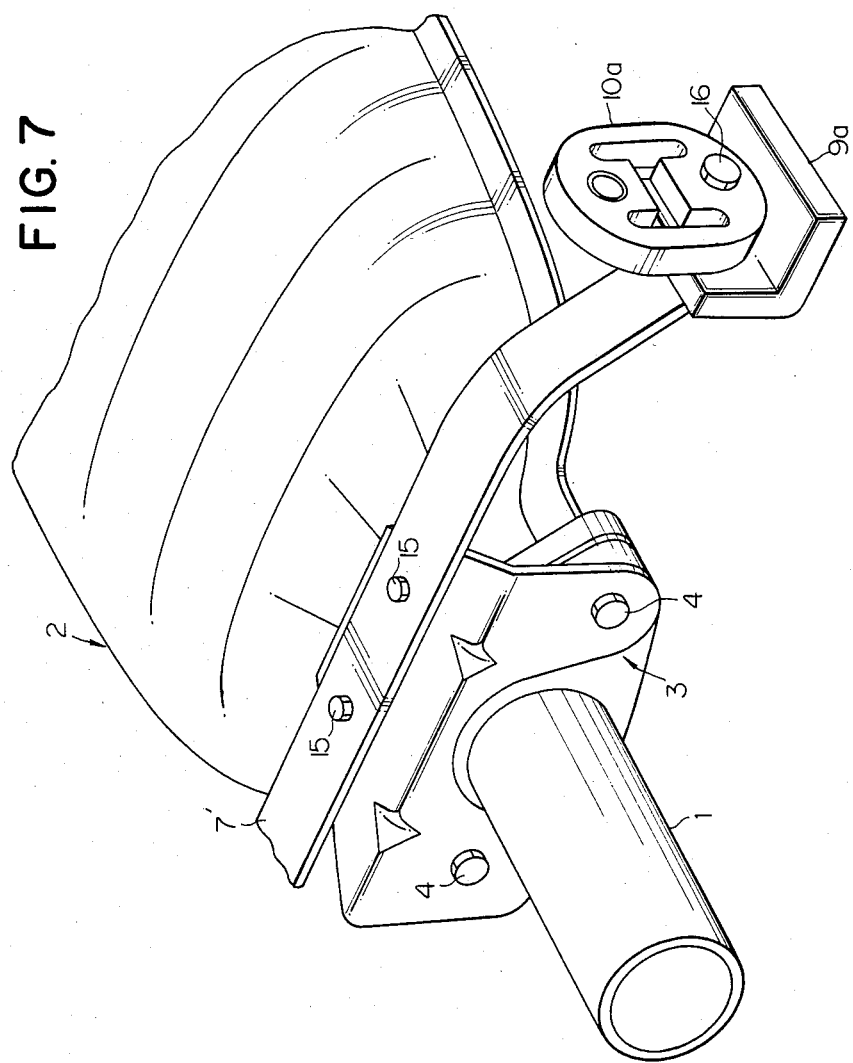

EXHAUST UNIT SUPPORT DEVICE

FIELD OF THE INVENTION

The present invention relates to an exhaust unit support device for having such component units as an exhaust pipe and a catalytic converter in the exhaust system of an internal combustion engine supported on the body structure of an automotive vehicle in such a manner that the vibrations to be transmitted through the exhaust system to the passenger compartment of the vehicle are reduced to a minimum.

BACKGROUND OF THE INVENTION

The exhaust system of an internal combustion engine of an automotive vehicle includes various component units such as an exhaust pipe, an exhaust-cleaning catalytic converter and a muffler or mufflers. These component units of the exhaust system are subjected to the vibrations originating in the power cylinders of the internal combustion engine and thus constitute a vibration system having a certain resonance frequency. When the frequencies of the vibrations transmitted to the exhaust system from the power cylinders of the engine happen to be coincident with the resonance frequency of the vibration system, the vibrations are carried to the vehicle body structure and produce booming noises in the passenger compartment of the vehicle.

In order to lessen such vibrations transmitted from the component units of the exhaust system to the passenger compartment, it has be proposed to use an exhaust unit support device constructed and arranged in such a manner as to dampen the vibrations of the exhaust component units. An example of such an exhaust unit support device is shown in Japanese Utility Mode Provisional Publication No. 52-90625. The prior-art exhaust unit support device therein shown includes a vibrating-damping mass member supporting a catalytic converter of the exhaust system and constitutes a vibration system in itself. The vibration-damping mass member included in the exhaust unit support device, however merely plays the role of a weight and is not adapted to support a unit constructed and arranged separately of the exhaust unit support device. For this reason, not only a disproportionately large number of component members and elements are required to construct the exhaust unit support device, but also extra steps are necessitated for the welding of the vibration-damping mass member to other members of the exhaust unit support device during installation of the exhaust system of the engine on the vehicle body structure. The present invention contemplates elimination of such a problem in a known exhaust unit support device of the described nature.

SUMMARY OF THE INVENTION

In accordance with the present invention, there is provided in an exhaust system of an internal combustion engine installed on an automotive vehicle having a body structure wherein the exhaust system includes exhaust-system component units, an exhaust unit support device for having the exhaust-system component units mounted on the vehicle body structure, comprising a first coupling member securely mounted on at least one of the exhaust-system component units, a second coupling member securely attached to the body structure, an elastic support member having a portion securely attached to the first coupling member and a portion securely attached to the second coupling member, and a vibration-damping block having a portion connected to the second coupling member and a portion connected to the vehicle body structure.

BRIEF DESCRIPTION OF THE DRAWINGS

The features and advantages of an exhaust unit support device according to the present invention will be more clearly understood from the following description taken in conjunction with the accompanying drawings in which like reference numerals designate similar or corresponding units, members and elements and in which:

FIG. 7 is a perspective view similar to FIG. 1 but shows a fourth preferred embodiment of an exhaust unit support device according to the present invention.

DESCRIPTION OF THE PREFERRED EMBODIMENTS

Figure 1:
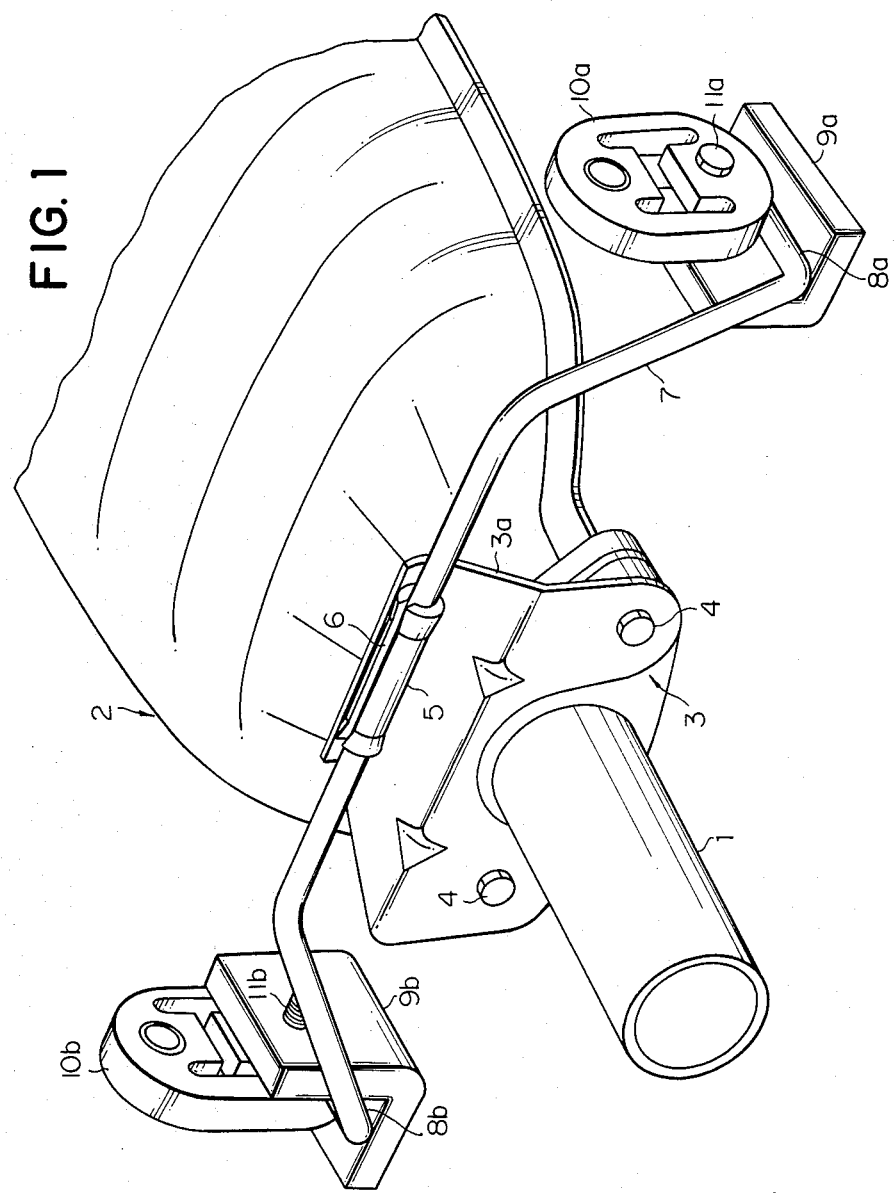
FIG. 1 is a perspective view showing a first preferred embodiment of an exhaust unit support device according to the present invention.

Referring to the drawings, first particularly to FIG. 1 thereof, a preferred embodiment of an exhaust unit support device according to the present invention is shown provided for an exhaust system including an exhaust pipe 1 and an exhaust-emission control catalytic converter 2 as exhaust-system component units. As is well known in the art, the exhaust pipe 1 lead from the exhaust manifold of an internal combustion engine and terminates in an exhaust pipe which is open at its leading end to the atmosphere, though not shown in the drawings. The catalytic converter 2 has incorporated therein an exhaust cleaning catalyst such as, for example, a "three-way" oxidative catalyst adapted to re-oxidize the unburned combustible residues of hydrocarbons and carbon monoxide and to reduce nitric oxides in the exhaust gases to be passed through the exhaust pipe 1, as also is well known in the art. The component units of the exhaust system incorporating the exhaust unit support device embodying the present invention may further include a muffler or mufflers mounted on the exhaust pipe 1, though not shown in the drawings.

The exhaust unit support device embodying the present invention is provided to have these exhaust-system component units supported on suitable structural members (not shown) of a body structure of an automotive vehicle and comprises a central bracket member 3 secured to the exhaust pipe 1 by suitable fastening means such as bolts 4 as shown. The central bracket member 3 is constructed of sheet metal and constitutes a first coupling member in the embodiment shown in FIGS. 1 and 2. The central bracket member 3 has an upper end portion 3a projecting upwardly away from the exhaust pipe 1 and has secured to the portion 3a generally tubular collar element 5 extending at right angles, in non-intersecting relationship, to the exhaust pipe 1 and formed with a groove 6 extending longitudinally of the collar element 5 and open at the opposite ends of the collar element 5, as will be better seen from FIG. 2 of the drawings. The collar element 5 is constructed of metal and is welded or otherwise securely attached to the upper end portion 3a of the central bracket member 3. An elastic support member 7 constituted by an elastic metal rod has a straight intermediate portion passed through the bore in the collar element 5 and welded or otherwise secured to the collar element 5 through the groove 6 in the element 5. The support member 7 further has a pair of arm portions 8a and 8b extending generally in parallel with the exhaust pipe 1 and having side bracket members 9a and 9b welded or otherwise securely attached thereto. Each of the side bracket members 9a and 9b is also constructed of sheet metal and constitutes a second coupling member in the embodiment of FIGS. 1 and 2. The side bracket members 9a and 9b in turn have secured thereto resilient vibration-damping blocks 10a and 10b each constructed of, for example, rubber. Each of the vibration-damping blocks 10a and 10b has one portion secured to each of the side bracket members 9a and 9b by suitable rigid fastening elements such as bolts 11a and 11b as shown and another end portion secured to a suitable structural member (not shown) of the vehicle body structure. The central bracket member 3, collar element 5, support member 7, side bracket members 9a and 9b and vibration-damping blocks 10a and 10b constitute in combination a vibration system having a certain resonance frequency proper to the system. The side bracket members 9a and 9b serve as vibration-damping mass members in this vibration system.

In the meantime, it is known in the art that the energy of the vibrations to be transmitted through a vibration system including a vibration-damping mass member decreases notably when the vibrations carried to the system occur at frequencies higher than the resonance frequency of the system times the square root of 2. It is further known that the vibrations transmitted from the exhaust system of an automotive internal combustion engine are responsible for creation of booming noises in the passenger compartment of an automotive vehicle particularly when the vibrations in the exhaust system occur at frequencies higher than about 140 hertz.

Figure 2:
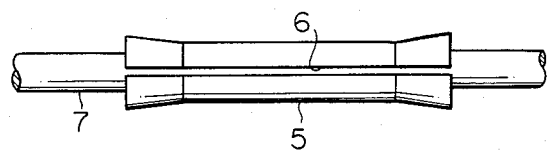
FIG. 2 is a fragmentary plan view showing part of the exhaust unit support device shown in FIG. 1.

For these reasons, the side bracket members 9a and 9b serving as the vibration-damping mass members in the exhaust unit support device described with reference to FIGS. 1 and 2 of the drawings are designed to have weights selected in such a manner that the exhaust unit support device resonates to the exhaust-system component units such as the exhaust pipe 1 and catalytic converter 2 with a resonance frequency ranging from about 10 hertz to about 100 hertz. If the vibrations transmitted from the internal combustion engine to the exhaust-system component units occur at frequencies higher than 140 hertz, the vibration frequencies are higher than the resonance frequency of the exhaust unit support device times the square root of 2. The exhaust unit support device having the side bracket members 9a and 9b designed as described above is, thus, effective to notably reduce the energy of the vibrations to be transmitted to the vehicle body structure therethrough.

Figure 3:
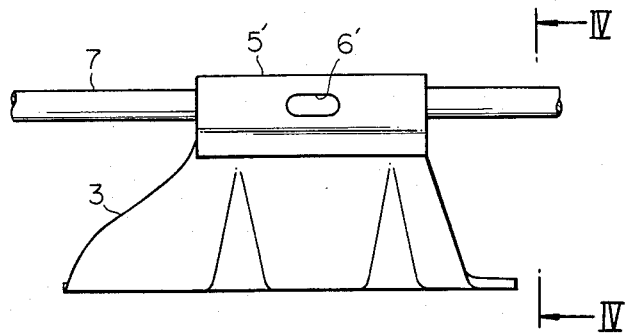
FIG. 3 is a fragmentary front end view of a second preferred embodiment of an exhaust unit support device according to the present invention.
Figure 4:
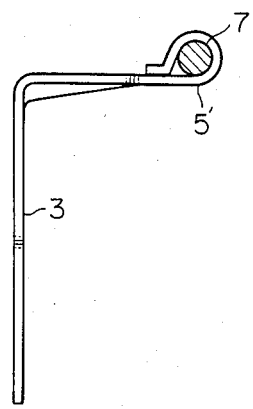
FIG. 4 is a fragmentary cross sectional view of the exhaust unit support device as viewed from a plane indicated by line IV—IV in FIG. 3.

In the second preferred embodiment of the present invention as shown partially in FIGS. 3 and 4, a collar element is constructed as an integral portion of the central bracket member 3. Thus, the central bracket member 3 has an upper end portion rolled to form a generally tubular collar portion 5' which is formed with a slot 6'. An elastic support member 7 constructed and arranged similarly to its counterpart in the embodiment of FIGS. 1 and 2 has its intermediate portion passed through the bore in the collar portion 5' and welded or otherwise secured to the collar portion 5' through the slot 6' in the rolled collar portion 5'. The embodiment shown in FIGS. 3 and 4 is in other respects similar in construction and arrangement to the embodiment of FIGS. 1 and 2. The embodiment of FIGS. 3 and 4 is, however, advantageous over the embodiment of FIGS. 1 and 2 in that the number of the component members and elements and, accordingly, the number of the steps to assemble the members and elements, and can be reduced by the elimination of the collar element 5 in FIGS. 1 and 2 and in that the central bracket member 3 and the support member 7 can be easily positioned correctly with respect to each other during assemblage of the exhaust unit support device.

Figure 5:
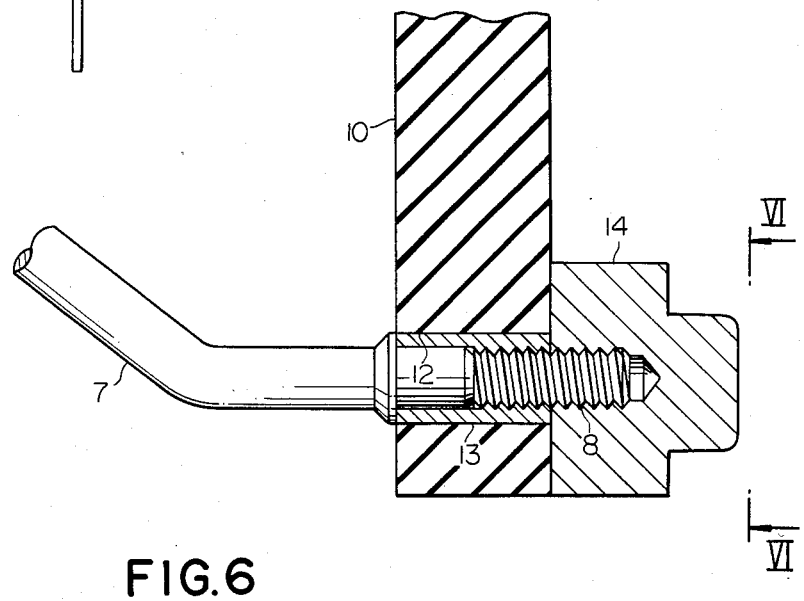
FIG. 5 is a fragmentary sectional view showing part of a third preferred embodiment of an exhaust unit support device according to the present invention.
Figure 6:
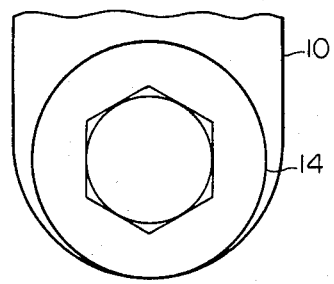
FIG. 6 is a fragmentary side elevation view of the exhaust unit support device as viewed from a plane indicated by line VI—VI in FIG. 5.

In the third preferred embodiment of the present invention as shown in FIGS. 5 and 6 of the drawings, each of the vibration-damping blocks 10a and 10b represented by a vibration-damping block 10 is formed with an opening 12 and an elastic support member 7 constituted by a metal rod has threaded opposite end portions represented by a threaded end portion 8. The threaded end portion 8 of the support member 7 is axially passed through a rigid tubular member constituted by a metal sleeve 13 closely received in the opening 12 in the vibration-damping block 10 and is screwed into an internally threaded rigid fastening element constituted by a nut 14. The vibration-damping block 10 is in this manner securely attached to each leading end portion of the support member 7 by means of the nut 14. The nut 14 thus serves as a second coupling member and a vibration-damping mass member in the embodiment of FIGS. 5 and 6. The sleeve 13 is provided to strengthen the torque to be transmitted from the nut 14 to the threaded end portion 8 of the support member 7 when the nut 14 is to be tightened to the portion 8. The third preferred embodiment of the present invention is thus advantageous in that the weight of the mass member and, accordingly, the resonance frequency of the exhaust unit support device can be adjusted simply by exchanging the nut 14 with a nut having the desired weight.

The fourth preferred embodiment of the present invention as shown in FIG. 7 is largely similar to the embodiment of FIG. 1 but comprises an elastic support member 7' constituted by a leaf spring in contrast to the metal rod constituting the support member 7 in each of the embodiments hereinbefore described. The support member 7' has a straight intermediate portion securely attached to the central bracket member 3 by means of bolts 15 and a pair of arm portions securely attached to the side bracket members 9a and 9b (FIG. 1) by means of bolts 16 (only one of which is shown). The bolts 15 and 16 may be replaced with any other forms of rigid fastening elements such as studs, rivets and/or nuts, though not shown in the drawings. Since the support member 7' can thus be secured to the central and side bracket members without having recourse to welding, not only formation of thermal stesses in the support member and bracket members can be avoided but the support member 7' can be attached to the bracket members more reliably than in the case in which the support member 7' is welded to the bracket members.

As will have been appreciated from the foregoing description, an exhaust unit support device proposed by the present invention is characterized in that each of the side vibration-damping blocks 10a and 10b serves not only as a member to have an elastic support member 7 secured thereto but also as a vibration-damping mass member. The vibration-damping mass member is thus constructed and arranged as part of the exhaust unit support device and for this reason need not be connected to other component members and elements of the exhaust unit support device during installation of the component units of the exhaust system on the body structure of a vehicle. Such a construction of the exhaust unit support device is useful for reducing the number of the component members and elements and the members of the steps to construct an exhaust unit support device and accordingly reducing the production cost of the exhaust unit support device. In addition to such an advantage achieved in an exhaust unit support device according to the present invention, the space requirement for the installation of the exhaust unit support device will be significantly alleviated when the elastic support member 7 is constituted by a metal rod as in each of the embodiments illustrated in FIGS. 1 to 6 of the drawings. The support member 7 constructed by a metal rod is further advantageous in that the same can be cooled efficiently due to the relatively small resistance to air streams and is for this reason adpated to protect the vibration-damping blocks 10a and 10b from the attacks of heat from the component units of the exhaust system.

What is claimed is:

1. In an exhaust system of an internal combustion engine installed on an automotive vehicle having a body structure wherein the exhaust system includes exhaust-system component units, an exhaust unit support device for having the exhaust-system component units mounted on the vehicle body structure, comprising:
   a first rigid coupling member rigidly secured to at least one of said exhaust-system component units,
   a second rigid coupling member,
   an elastic support member having its central portion rigidly secured to the first rigid coupling member and a portion rigidly secured to the second rigid coupling member, the first rigid coupling member rigidly and structurally intervening between the elastic support member and said one of the exhaust-system component units, and
   an elastic vibration-damping block having a portion connected to the second rigid coupling member by rigid fastening means and a portion connected to the vehicle body structure by rigid fastening means, wherein said second rigid coupling member has a weight predetermined to enable the second rigid coupling member to serve as a vibration-damping mass member.

2. An exhaust unit support device as set forth in claim 1, in which said weight of said second rigid coupling member is selected so that the exhaust system has a resonance frequency ranging between about 10 hertz and about 100 hertz.

3. An exhaust unit support device as set forth in claim 1 or 2, in which said elastic support member is constituted by a metal rod having a substantially circular cross section.

4. An exhaust unit support device as set forth in claim 3, in which said first rigid coupling member is constructed of metal and is welded to said elastic support member.

5. An exhaust unit support device as set forth in claim 4, in which said second rigid coupling member is constructed of metal and is welded to said elastic support member.

6. An exhaust unit support device as set forth in claim 1 or 2, in which said elastic support member is constituted by a leaf spring.

7. An exhaust unit support device as set forth in claim 6, in which said elastic support member is secured to said first rigid coupling member by means of a rigid fastening element.

8. An exhaust unit support device as set forth in claim 7, in which said elastic support member is secured to said second rigid coupling member by means of a rigid fastening element.

9. An exhaust unit support device as set forth in claim 1 or 2, further comprising a rigid substantially tubular element secured to said first rigid coupling member, said elastic support member having a portion passed through and welded to said tubular element, said tubular member rigidly and structurally intervening between said first rigid coupling member and said elastic support member.

10. An exhaust unit support device as set forth in claim 9, in which said tubular element is formed with a groove extending longitudinally of the tubular element and open at the opposite ends of the tubular element, said elastic support member having said portion thereof welded to said tubular element through said groove.

11. An exhaust unit support device as set forth in claim 10, in which said tubular element is welded to said first coupling member.

12. An exhaust unit support device as set forth in claim 1 or 2, in which said first rigid coupling member has a tubular portion secured to a portion of said elastic support member.

13. An exhaust unit support device as set forth in claim 12, in which said tubular portion of the first rigid coupling member is welded to said portion of the elastic support member.

14. An exhaust unit support device as set forth in claim 13, in which said tubular portion of the first rigid coupling member is formed with a slot through which the tubular portion is welded to said portion of the elastic support member.

15. An exhaust unit support device as set forth in claim 1 or 2, in which said second rigid coupling member is constituted by an internally threaded member and said vibration-damping block is formed with an opening, said elastic support member having an externally threaded end portion axially passed through said opening in the vibration-damping block and screwed into said internally threaded member.

16. An exhaust unit support device as set forth in claim 15, further comprising a rigid tubular member closely received in said opening in said vibrations-damping block and having said threaded end portion of the support member passed therethrough.

* * * * *